United States Patent
Hayashi et al.

(10) Patent No.: US 10,991,254 B2
(45) Date of Patent: Apr. 27, 2021

(54) USER VEHICLE DISPATCH DEALING SYSTEM AND STORAGE MEDIUM

(71) Applicant: TOYOTA JIDOSHA KABUSHIKI KAISHA, Toyota (JP)

(72) Inventors: Takashi Hayashi, Mishima (JP); Junya Watanabe, Sunto-gun (JP); Yuji Sasaki, Toyota (JP); Seiji Arakawa, Sunto-gun (JP); Naotoshi Kadotani, Sunto-gun (JP); Masafumi Hayakawa, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 34 days.

(21) Appl. No.: 16/209,345

(22) Filed: Dec. 4, 2018

(65) Prior Publication Data
US 2019/0180628 A1    Jun. 13, 2019

(30) Foreign Application Priority Data
Dec. 11, 2017  (JP) .............................. JP2017-236788

(51) Int. Cl.
| G08G 1/00 | (2006.01) |
| G06Q 10/02 | (2012.01) |
| G06Q 10/08 | (2012.01) |
| G05D 1/00 | (2006.01) |
| G06Q 50/30 | (2012.01) |

(52) U.S. Cl.
CPC .......... *G08G 1/202* (2013.01); *G05D 1/0088* (2013.01); *G06Q 10/02* (2013.01); *G06Q 10/083* (2013.01); *G06Q 50/30* (2013.01); *G05D 2201/02* (2013.01)

(58) Field of Classification Search
None
See application file for complete search history.

(56) References Cited

U.S. PATENT DOCUMENTS

| 9,256,852 | B1 | 2/2016 | Myllymaki |
| 9,552,564 | B1 | 1/2017 | Martenis |
| 2016/0048804 | A1 | 2/2016 | Paul et al. |
| 2016/0189098 | A1 | 6/2016 | Beaurepaire et al. |
| 2017/0228690 | A1 | 8/2017 | Kohli |
| 2017/0236092 | A1 | 8/2017 | High et al. |
| 2018/0144300 | A1 | 5/2018 | Wiechers |

FOREIGN PATENT DOCUMENTS

WO    2017/005437 A1    1/2017

*Primary Examiner* — Tamara L Weber
(74) *Attorney, Agent, or Firm* — Sughrue Mion, PLLC

(57) ABSTRACT

A user vehicle dispatch dealing system dispatches a passenger transport vehicle according to a vehicle dispatch request, which includes a riding point and a destination point. The system includes a vehicle situation obtaining unit that obtains a freight delivery vehicle situation including a delivery route and a current position of a freight delivery vehicle that delivers freight by autonomous driving, a vehicle situation determination unit that determines whether or not there is the freight delivery vehicle as a dispatch vehicle candidate in a state where a first preset range defined based on the delivery route includes the riding point, and an option presentation unit that presents an option of whether or not to request the dispatch of the freight delivery vehicle as the dispatch vehicle candidate to the user when the vehicle situation determination unit determines that there is the freight delivery vehicle as the dispatch vehicle candidate.

5 Claims, 7 Drawing Sheets

USER VEHICLE DISPATCH DEALING SYSTEM AND STORAGE MEDIUM

CROSS-REFERENCE TO RELATED APPLICATION

This application claims the benefit of priority from Japanese Patent Application No. 2017-236788, filed Dec. 11, 2017, the entire contents of which are incorporated herein by reference.

TECHNICAL FIELD

The disclosure relates to a user vehicle dispatch dealing system and a storage medium.

BACKGROUND

A system that manages a freight delivery vehicle that delivers freight by autonomous driving has been known. For example, United States Patent Application, Publication No. 2017/0228690 discloses a system that delivers freight to a delivery location by using a freight delivery vehicle and delivers the freight to an authenticated receiver.

SUMMARY

In the system that manages the freight delivery vehicle described above, the freight delivery vehicle is specialized in the delivery of the freight.

Incidentally, a system that dispatches a passenger transport vehicle that transports a user according to a vehicle dispatch request from the user has been known. In the system that dispatches the passenger transport vehicle, the passenger transport vehicle that specializes in the transport of the user is used to transport the passenger, and the freight delivery vehicle is not considered to be used to transport the passenger.

An object of the disclosure is to provide a user vehicle dispatch dealing system capable of increasing the number of options of vehicles that can be used by a user in order to transport a passenger.

A user vehicle dispatch dealing system according to the disclosure is a user vehicle dispatch dealing system that dispatches a passenger transport vehicle that transports a user according to a vehicle dispatch request, which includes a riding point and a destination point, from the user. The system includes a vehicle situation obtaining unit configured to obtain a freight delivery vehicle situation including a delivery route and a current position of a freight delivery vehicle that delivers freight by autonomous driving when the vehicle dispatch request is received, a vehicle situation determination unit configured to determine whether or not there is the freight delivery vehicle as a dispatch vehicle candidate in a state where a first preset range defined based on the delivery route includes the riding point based on the freight delivery vehicle situation obtained by the vehicle situation obtaining unit, and an option presentation unit configured to present an option of whether or not to request the dispatch of the freight delivery vehicle as the dispatch vehicle candidate to the user when the vehicle situation determination unit determines that there is the freight delivery vehicle as the dispatch vehicle candidate.

According to the user vehicle dispatch dealing system, the passenger transport vehicle is normally used to transport the passenger. Meanwhile, when there is the freight delivery vehicle as a dispatch vehicle candidate in a state where a first preset range defined based on the delivery route includes the riding point, the option of whether or not to request the dispatch of the freight delivery vehicle as the dispatch vehicle candidate is presented to the user. Thus, this system can allow the user to select whether or not to use the freight delivery vehicle capable of being dispatched in the passenger transport instead of the passenger transport vehicle. Accordingly, this system can increase the number of options for selecting the vehicles capable of being used by the user in order to transport the passenger.

In the user vehicle dispatch dealing system according to the disclosure, the vehicle situation determination unit may determine that there is the freight delivery vehicle as the dispatch vehicle candidate when there is the freight delivery vehicle in a state where the first range defined based on the delivery route includes the riding point and in a state where a second preset range defined based on the delivery route includes the destination point. Accordingly, this system can allow the user to select whether or not to use the freight delivery vehicle capable of being dispatched and transporting the user to the destination point in the passenger transport instead of the passenger transport vehicle. Therefore, in this system, the user can select the vehicle to be dispatched depending on the distance between the point at which the user leaves the vehicle and the destination point.

The user vehicle dispatch dealing system according to the disclosure may further include a user-addressed freight determination unit configured to determine whether or not there is a user freight delivery vehicle which is the freight delivery vehicle that delivers the freight addressed to the user when the vehicle dispatch request is received. The option presentation unit may present an option of whether or not to request the dispatch of the user freight delivery vehicle to the user when the user-addressed freight determination unit determines that there is the user freight delivery vehicle. Accordingly, this system can allow the user to select whether or not to use the user freight delivery vehicle that delivers the freight addressed to the user in the passenger transport instead of the passenger transport vehicle. When the user freight delivery vehicle is used to transport the passenger instead of the passenger transport vehicle, since the user can move by using the dispatched user freight delivery vehicle and receives their freight from the user freight delivery vehicle, the efficiency in the transport of the passenger and the delivery of the freight is improved. Thus, in this system, the user can select the vehicle to be dispatched depending on the efficiency in the transport of the passenger and the delivery of the freight.

In the user vehicle dispatch dealing system according to the disclosure, the vehicle situation obtaining unit may obtain a passenger transport vehicle situation including a current position of the passenger transport vehicle when the vehicle dispatch request is received, the vehicle situation determination unit may determine whether or not there is the passenger transport vehicle as the dispatch vehicle candidate in a state where a third preset range defined based on the current position of the passenger transport vehicle includes the riding point based on the passenger transport vehicle situation obtained by the vehicle situation obtaining unit, and the option presentation unit may not present the option of whether or not to request the dispatch of the freight delivery vehicle as the dispatch vehicle candidate to the user when the vehicle situation determination unit determines that there is the passenger transport vehicle as the dispatch vehicle candidate, and may present the option of whether or not to request the dispatch of the freight delivery vehicle as the dispatch vehicle candidate to the user when the vehicle situation determination unit determines that there is no passenger transport vehicle as the dispatch vehicle candidate and determines that there is the freight delivery vehicle as the dispatch vehicle candidate. The user vehicle dispatch dealing system may further include a vehicle dispatch unit that dispatches the freight delivery vehicle as the dispatch vehicle candidate in order to transport the user when the option of requesting the dispatch of the freight delivery vehicle as the dispatch vehicle candidate is selected by the user. Accordingly, this system uses the passenger transport vehicle in the passenger transport when there is the passenger transport vehicle capable of being promptly dispatched. Meanwhile, this system can allow the user to select whether or not to use the freight delivery vehicle capable of being dispatched in the passenger transport instead of the passenger transport vehicle when there is no passenger transport vehicle capable of being promptly dispatched. This system can dispatch the freight delivery vehicle when the option of using the freight delivery vehicle in the passenger transport is selected by the user. Therefore, in this system, there is a high possibility that the vehicle for transporting the passenger will be able to be promptly dispatched.

A storage medium according to the disclosure is a non-transitory computer-readable storage medium configured to store a user vehicle dispatch dealing program that dispatches a passenger transport vehicle that transports a user according to a vehicle dispatch request, which includes a riding point and a destination point, from a user terminal, the user vehicle dispatch dealing program executed by a server connected so as to communicate with the user terminal, Wherein the user vehicle dispatch dealing program causes the server to function as a vehicle situation obtaining unit configured to obtain a freight delivery vehicle situation including a delivery route and a current position of a freight delivery vehicle that delivers freight by autonomous driving, when the vehicle dispatch request is received, a vehicle situation determination unit configured to determine whether or not there is the freight delivery vehicle as a dispatch vehicle candidate in a state where a first preset range defined based on the delivery route includes the riding point based on the freight delivery vehicle situation obtained by the vehicle situation obtaining unit, and an option presentation unit configured to transmit an information regarding an option of whether or not to request the dispatch of the freight delivery vehicle as the dispatch vehicle candidate to the user terminal, when the vehicle situation determination unit determines that there is the freight delivery vehicle as the dispatch vehicle candidate.

The storage medium have the same effects of the user vehicle dispatch dealing system.

According to the disclosure, it is possible to increase the number of options for selecting the vehicles capable of being used by the user in order to transport the passenger.

DETAILED DESCRIPTION

Hereinafter, illustrative embodiments will be described with reference to the drawings.

[Configuration of User Vehicle Dispatch Dealing System]

Figure 1:
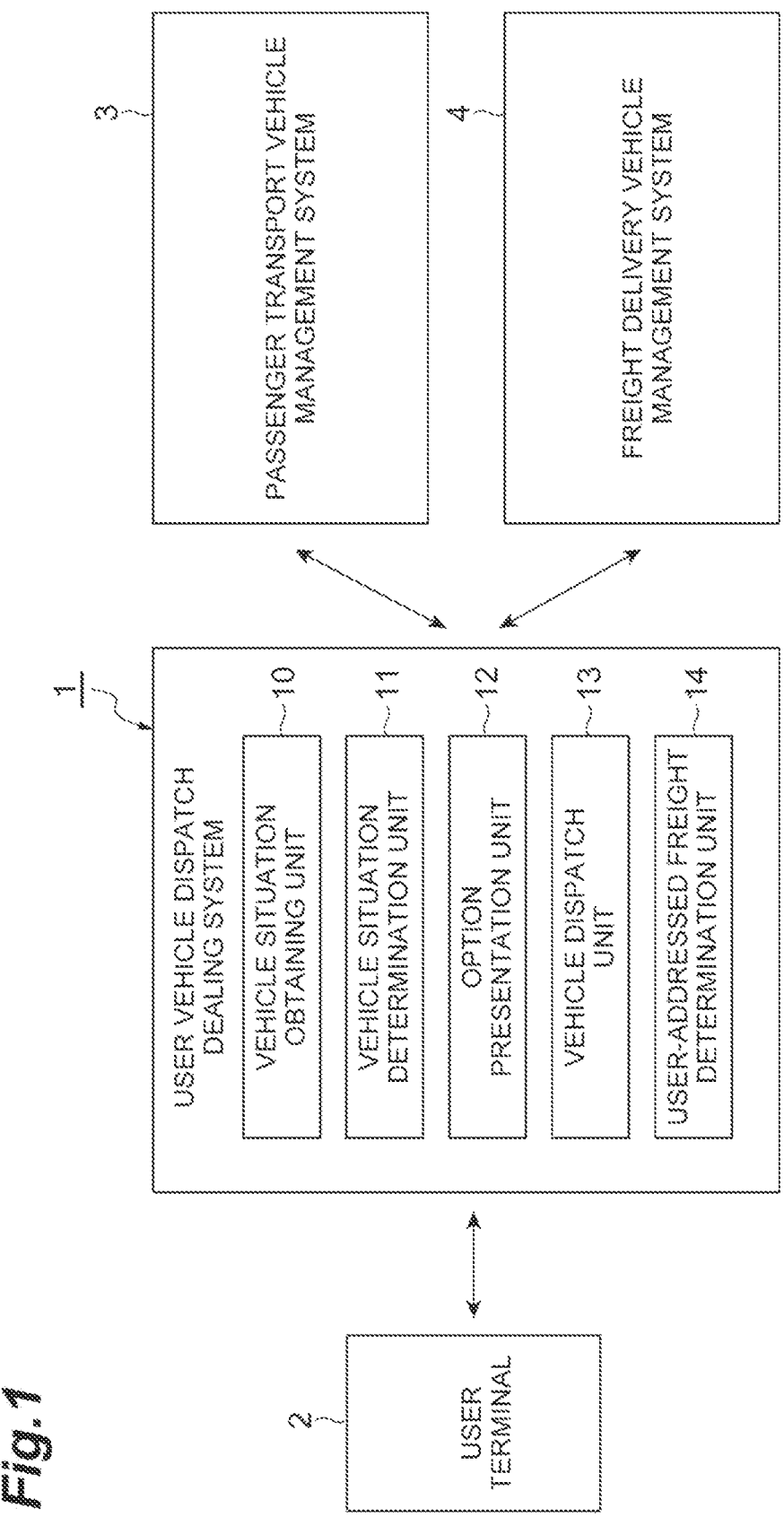
FIG. 1 is a block diagram showing a user vehicle dispatch dealing system.

FIG. 1 is a block diagram showing a user vehicle dispatch dealing system 1. The user vehicle dispatch dealing system 1 shown in FIG. 1 is a system that dispatches a vehicle which transports a user according to a vehicle dispatch request, which includes a riding point and a destination point, from the user. For example, the user vehicle dispatch dealing system 1 is connected so as to communicate with a plurality of user terminals 2, a passenger transport vehicle management system 3, and a freight delivery vehicle management system 4 via a communication network. The user transmits the vehicle dispatch request to the user vehicle dispatch dealing system 1 by manipulating the user terminal 2. For example, the user terminal 2 is a mobile information terminal including a smartphone or a tablet computer.

The "vehicle dispatch request" is a dispatch request for a vehicle for transporting a passenger. The "riding point" is a point set in the vehicle dispatch request, as a point at which the user desires to ride the vehicle. The "destination point" is a point set in the vehicle dispatch request, as a point at which the user desires to leave the vehicle. As will be described below, the user vehicle dispatch dealing system 1 is not necessarily limited to a case where the user rides the dispatched vehicle at the riding point, and the user may ride the vehicle at a point within a predetermined range from the riding point. The user vehicle dispatch dealing system is not necessarily limited to a case where the user leaves the dispatched vehicle at the destination point, and the user may leave the vehicle at a point within a predetermined range from the destination point.

The passenger transport vehicle management system 3 is a system that manages a passenger transport vehicle. For example, the passenger transport vehicle management system 3 is a system that provides a service used for dispatching the passenger transport vehicle according to a request from the user. The passenger transport vehicle management system 3 manages a plurality of passenger transport vehicles. The passenger transport vehicle management system 3 recognizes a passenger transport vehicle situation of each passenger transport vehicle. The "passenger transport vehicle situation" is information including a current position of each passenger transport vehicle.

The "passenger transport vehicle" is a vehicle that is managed by the passenger transport vehicle management system 3, and primarily transports the passenger. For example, a vehicle classified as a passenger car (or a vehicle classification corresponding to the passenger car) in a legal system of each country may be used as the passenger transport vehicle. The passenger transport vehicle may be a vehicle run with or without charge for the purpose of the passenger transport. The passenger transport vehicle may be a vehicle (taxi or bus) allowed to be run with or without charge for the purpose of the passenger transport in the legal system of each country. The passenger transport vehicle may be an autonomous drive vehicle or may be a manual driving vehicle.

The freight delivery vehicle management system 4 is a system that manages a freight delivery vehicle. For example, the freight delivery vehicle management system 4 is a system that provides a service used for delivery freight by using the freight delivery vehicle according to a request from the user. The freight delivery vehicle management system 4 manages a plurality of freight delivery vehicles. The freight delivery vehicle management system 4 recognizes a freight delivery vehicle situation of each freight delivery vehicle. The "freight delivery vehicle situation" is information including a delivery route and a current position of each freight delivery vehicle.

The "freight delivery vehicle" is an autonomous driving vehicle that is managed by the freight delivery vehicle management system 4, and primarily delivers the freight. For example, a vehicle classified as a cargo car (or vehicle classification corresponding to the cargo car) may be used as the freight delivery vehicle. The freight delivery vehicle may be a vehicle run with or without charge for the purpose of the freight delivery. The freight delivery vehicle may be a vehicle allowed to be run with or without charge for the purpose of the freight delivery in the legal system of each country. For example, the freight delivery vehicle is a truck or a van. The freight delivery vehicle is an autonomous driving vehicle that delivers the freight by autonomous driving.

The "autonomous driving vehicle" is a vehicle that is able to automatically travel toward a preset destination. The autonomous driving vehicle does not need to be driven by a driver, and automatically travels.

Figure 2:
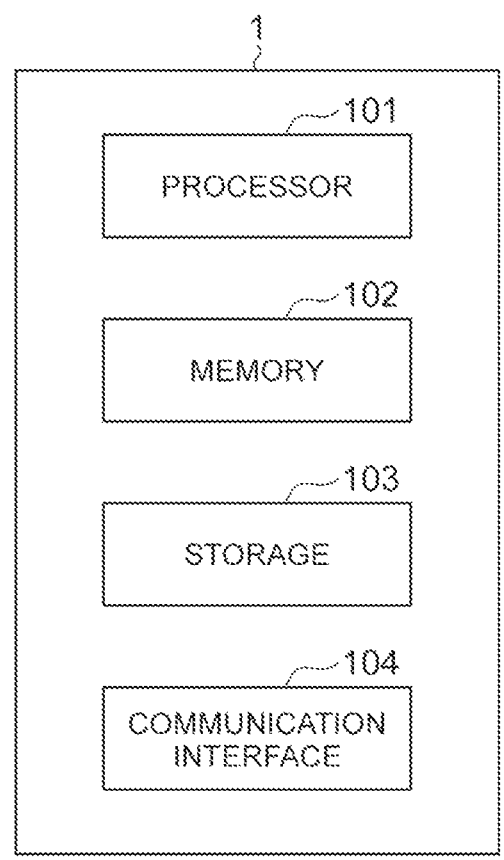
FIG. 2 is a diagram showing an example of a hardware configuration of a user vehicle dispatch dealing system.

FIG. 2 is a diagram showing an example of a hardware configuration of the user vehicle dispatch dealing system 1. As shown in FIG. 2, the user vehicle dispatch dealing system 1 includes a processor 101, a memory 102, a storage 103, and a communication interface 104, and is a general server (computer). The server includes a central processing unit (CPU), a read-only memory (ROM), and a random-access memory (RAM), and realizes the functions of the user vehicle dispatch dealing system 1. The user vehicle dispatch dealing system 1 may include a plurality of servers.

The user vehicle dispatch dealing system 1 includes a vehicle situation obtaining unit 10, a vehicle situation determination unit 11, an option presentation unit 12, a vehicle dispatch unit 13, and a user-addressed freight determination unit 14.

When the user vehicle dispatch dealing system 1 receives the vehicle dispatch request from the user terminal 2, the vehicle situation obtaining unit 10 communicates with the passenger transport vehicle management system 3, and obtains the passenger transport vehicle situation of each passenger transport vehicle from the passenger transport vehicle management system 3.

When the user vehicle dispatch dealing system 1 receives the vehicle dispatch request from the user terminal 2, the vehicle situation obtaining unit 10 communicates with the freight delivery vehicle management system 4, and obtains the freight delivery vehicle situation of each freight delivery vehicle from the freight delivery vehicle management system 4.

The vehicle situation determination unit 11 determines whether or not there are the freight delivery vehicles as dispatch vehicle candidates based on the freight delivery vehicle situation of each freight delivery vehicle obtained by the vehicle situation obtaining unit 10. The "freight delivery vehicles as the dispatch vehicle candidates" are freight delivery vehicles that satisfy a predetermined condition corresponding to the vehicle dispatch request from the user. When the freight delivery vehicle is actually dispatched, the freight delivery vehicle to be dispatched is determined among the freight delivery vehicles as the dispatch vehicle candidates.

Here, the freight delivery vehicles as the dispatch vehicle candidates are the freight delivery vehicle in a state where the first range defined based on the delivery route includes the riding point and in a state where a second preset range defined based on the delivery route includes the destination point. That is, the vehicle situation determination unit 11 determines whether or not there are the freight delivery vehicle in a state where the first range defined based on the delivery route includes the riding point and in a state where a second preset range defined based on the delivery route includes the destination point based on the freight delivery vehicle situation of each freight delivery vehicle obtained by the vehicle situation obtaining unit 10. In other words, when the delivery route includes the riding point within the first range and the delivery route includes the destination point within the second range, the vehicle situation determination unit 11 determines that there are the freight delivery vehicles as the dispatch vehicle candidates. The "delivery route" is a preset route on which the freight delivery vehicle travels when the freight delivery vehicle delivers the freight by the autonomous driving.

The "a first preset range defined based on the delivery route" may mean that a direct distance between any point on the delivery route of the freight delivery vehicle and the riding point falls within a range of a preset distance, may mean that a distance along a road from any point on the delivery route of the freight delivery vehicle to the riding point falls within a range of a preset distance, or may mean that a time required to travel between any point on the delivery route of the freight delivery vehicle and the riding point falls within a range of a preset time. The required time may be calculated by the known method. The "any point on the delivery route" may be any point on the delivery route within a preset distance or a required time from the current position of the freight delivery vehicle. When the delivery route of the freight delivery vehicle includes the riding point within the first range, the user may move by foot a distance between any point on the delivery route and the riding point (that is, a point set in the vehicle dispatch request, as a point at which the user desires to ride the vehicle). That is, the point at which the user actually rides the freight delivery vehicle may be set on the delivery route again.

The "a second preset range defined based on the delivery route" may mean that a direct distance between any point on the delivery route of the freight delivery vehicle and the destination point falls within a range of a preset distance, may mean that a distance along a road from any point on the delivery route of the freight delivery vehicle and the destination point falls within a range of a preset distance, or may mean that a time required to travel between any point on the delivery route of the freight delivery vehicle and the destination falls within a range of a preset time. The required time may be calculated by the known method. The second range may be the range of the same distance or the same required time as those of the first range, or may be a range of a distance or a time different from those of the first range. When the delivery route of the freight delivery vehicle includes the destination point within the second range, the user may move by foot a distance between any point on the delivery route and the destination point (that is, a point set in the vehicle dispatch request, as a point at which the user desires to leave the vehicle). That is, the point at which the user actually leaves the freight delivery vehicle may be set on the delivery route again.

The vehicle situation determination unit 11 determines whether or not there are the passenger transport vehicles as dispatch vehicle candidates based on the passenger transport vehicle situation of each passenger transport vehicle obtained by the vehicle situation obtaining unit 10. The "passenger transport vehicles as the dispatch vehicle candidates" are the passenger transport vehicles that satisfy a predetermined condition corresponding to the vehicle dispatch request from the user. When the passenger transport vehicle is actually dispatched, the passenger transport vehicle to be dispatched is determined among the passenger transport vehicles as the dispatch vehicle candidates.

Here, the passenger transport vehicles as the dispatch vehicle candidates are the passenger transport vehicle in a state where a third preset range defined based on the current position of the passenger transport vehicle includes the riding point. That is, the vehicle situation determination unit 11 determines whether or not there are the passenger transport vehicles as the dispatch vehicle candidates in a state where a third preset range defined based on the current position of the passenger transport vehicle includes the riding point based on the passenger transport vehicle situation of each passenger transport vehicle obtained by the vehicle situation obtaining unit 10.

The "a third preset range defined based on the current position of the passenger transport vehicle" may mean that a direct distance between the current position of the passenger transport vehicle and the riding point falls within a range of a preset distance, may mean that a distance along a road from the current position of the passenger transport vehicle to the riding point falls within a range of a preset distance, or may mean that a time required to travel between the current position of the passenger transport vehicle and the riding point falls within a range of a preset time. The required time may be calculated by the known method.

The option presentation unit 12 presents an option of whether or not to request the dispatch of the freight delivery vehicle as the dispatch vehicle candidate to the user. For example, the option presentation unit 12 transmits information regarding the option of whether or not to request the dispatch of the freight delivery vehicle as the dispatch vehicle candidate to the user terminal 2. For example, the option presentation unit 12 presents the option to the user by displaying the option of whether or not to request the dispatch of the freight delivery vehicle as the dispatch vehicle candidate on the user terminal 2. The option presentation unit 12 receives the option selected by the user from the user terminal 2 by presenting the option of whether or not to request the dispatch of the freight delivery vehicle as the dispatch vehicle candidate to the user. For example, when the vehicle situation determination unit 11 determines that there are the freight delivery vehicles as the dispatch vehicle candidates or when the vehicle situation determination unit 11 determines that there are no passenger transport vehicles as the dispatch vehicle candidates and determines that there are the freight delivery vehicles as the dispatch vehicle candidates according to the process performed by the user vehicle dispatch dealing system 1, the option presentation unit 12 presents the option of whether or not to request the dispatch of the freight delivery vehicle as the dispatch vehicle candidate to the user. When the vehicle situation determination unit 11 determines that there are the passenger transport vehicles as the dispatch vehicle candidates, the option presentation unit 12 may not present the option of whether or not to request the dispatch of the freight delivery vehicle as the dispatch vehicle candidate to the user.

When the user-addressed freight determination unit 14 determines that there is a user freight delivery vehicle, the option presentation unit 12 presents the option of whether or not to request the dispatch of the user freight delivery vehicle to the user (the details will be described below). The "user freight delivery vehicle" means a freight delivery vehicle that delivers the freight addressed to the user. For example, the option presentation unit 12 presents the option to the user by displaying the option of whether or not to request the dispatch of the user freight delivery vehicle on the user terminal 2. The option presentation unit 12 receives the option selected by the user from the user terminal 2 by presenting the option of whether or not request the dispatch of the user freight delivery vehicle to the user.

When the vehicle situation determination unit 11 determines that there are the passenger transport vehicles as the dispatch vehicle candidates, the vehicle dispatch unit 13 communicates with the passenger transport vehicle management system 3, and dispatches the passenger transport vehicle as the dispatch vehicle candidate by using the passenger transport vehicle management system 3 in order to transport the passenger (that is, in order to transport the user). For example, the vehicle dispatch unit 13 dispatches the passenger transport vehicle as the dispatch vehicle candidate to the riding point set in the vehicle dispatch request.

When the option of dispatching the freight delivery vehicle as the dispatch vehicle candidate is selected by the user, the vehicle dispatch unit 13 communicates with the freight delivery vehicle management system 4, and dispatches the freight delivery vehicle as the dispatch vehicle candidate by using the freight delivery vehicle management system 4 in order to transport the passenger (that is, in order to transport the user). For example, the vehicle dispatch unit 13 dispatches the freight delivery vehicle as the dispatch vehicle candidate to a point on the delivery route near the riding point set in the vehicle dispatch request.

When the option of dispatching the user freight delivery vehicle is selected by the user, the vehicle dispatch unit 13 communicates with the freight delivery vehicle management system 4, and dispatches the user freight delivery vehicle by using the freight delivery vehicle management system 4 in order to transport the passenger (that is, in order to transport the user). For example, the vehicle dispatch unit 13 dispatches the user freight delivery vehicle to a point on the delivery route near the riding point set in the vehicle dispatch request.

For example, when the freight delivery vehicle or the user freight delivery vehicle is used as the vehicle for transporting the passenger, the user may be seated in a driver seat or a passenger seat which is vacant, or a seating position in a freight room.

When the user vehicle dispatch dealing system 1 receives the vehicle dispatch request from the user terminal 2, the user-addressed freight determination unit 14 obtains a freight delivery situation using each freight delivery vehicle, and determines whether or not there are the user freight delivery vehicle which is the freight delivery vehicle that delivers the freight addressed to the user based on the obtained freight delivery situation. The "freight delivery situation" is information regarding the delivery of the freight using the freight delivery vehicle. For example, the freight delivery situation includes information such as a destination address of the freight which is loaded on the freight delivery vehicle and is being delivered.

[Process of Presenting Option of Using Freight Delivery Vehicle]

Figure 3:
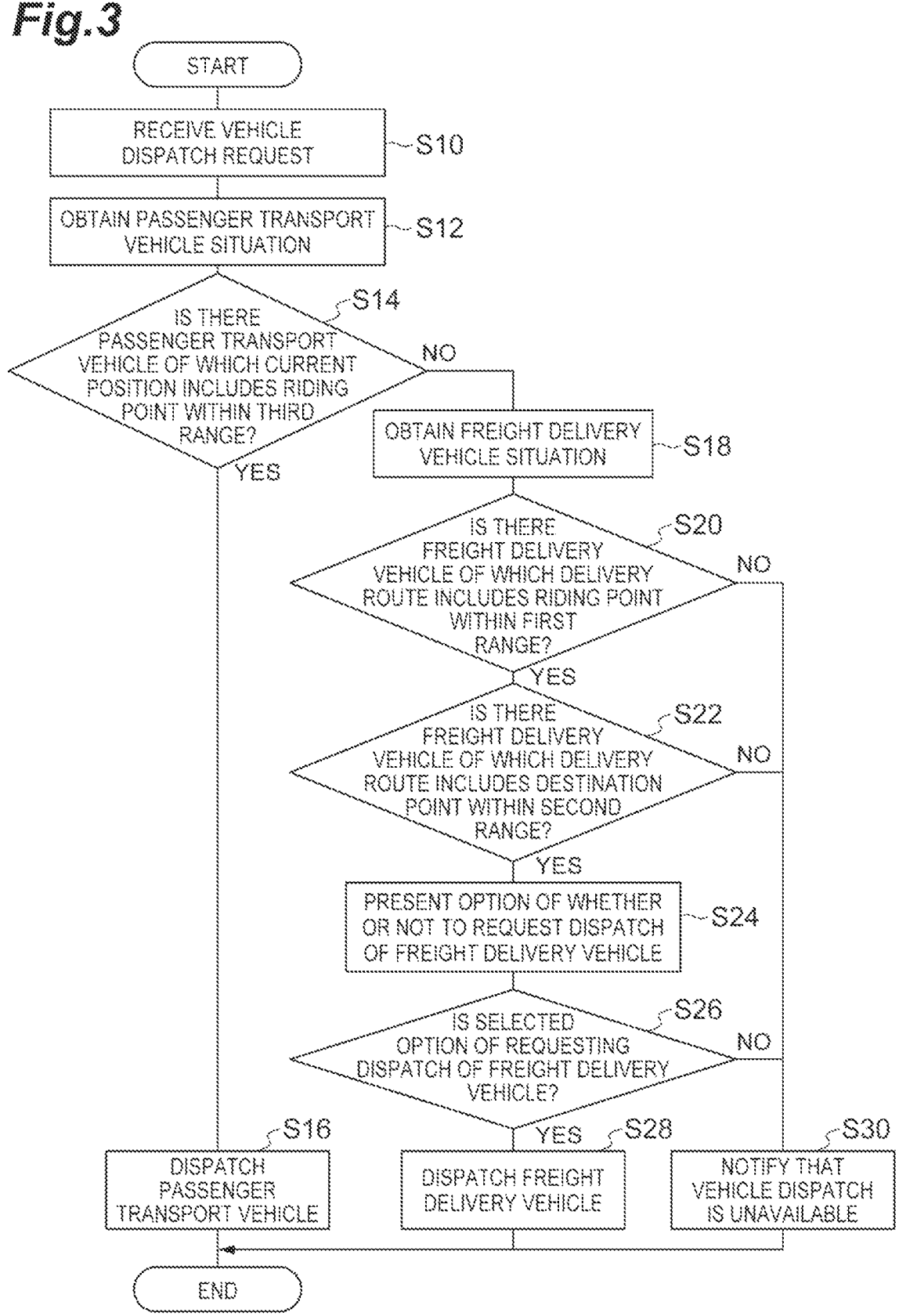
FIG. 3 is a flowchart showing a process of presenting an option of using a freight delivery vehicle.

Hereinafter, a process of presenting an option of using the freight delivery vehicle which performed by the user vehicle dispatch dealing system 1 will be described. FIG. 3 is a flowchart showing the process of presenting the option of using the freight delivery vehicle.

As shown in FIG. 3, in step S10, the user vehicle dispatch dealing system 1 receives the vehicle dispatch request from the user from the user terminal 2 manipulated by the user. Thereafter, the user vehicle dispatch dealing system 1 proceeds to step S12.

In step S12, the user vehicle dispatch dealing system 1 communicates with the passenger transport vehicle management system 3, and obtains the passenger transport vehicle situation of each passenger transport vehicle from the passenger transport vehicle management system 3 by using the vehicle situation obtaining unit 10. Subsequently, the user vehicle dispatch dealing system 1 proceeds to step S14.

In step S14, the user vehicle dispatch dealing system 1 determines whether or not there are the passenger transport vehicles as the dispatch vehicle candidates by using the vehicle situation determination unit 11. More specifically, the vehicle situation determination unit 11 determines whether or not there are the passenger transport vehicles as the dispatch vehicle candidates in a state where a third preset range defined based on the current position of the passenger transport vehicle includes the riding point based on the passenger transport vehicle situation of each passenger transport vehicle obtained by the vehicle situation obtaining unit 10. When the vehicle situation determination unit determines that there are the passenger transport vehicles as the dispatch vehicle candidates (step S14: YES), the user vehicle dispatch dealing system 1 proceeds to step S16. Meanwhile, when the vehicle situation determination unit does not determine that there are the passenger transport vehicles as the dispatch vehicle candidates (step S14: NO), the user vehicle dispatch dealing system 1 proceeds to step S18.

In step S16, the user vehicle dispatch dealing system 1 does not present the option of whether or not to request the dispatch of the freight delivery vehicle as the dispatch vehicle candidate to the user by using the option presentation unit 12, communicates with the passenger transport vehicle management system 3, and dispatches the passenger transport vehicle as the dispatch vehicle candidate by using the vehicle dispatch unit 13 in order to transport the passenger. Thereafter, the user vehicle dispatch dealing system 1 ends this process.

In step S18, the user vehicle dispatch dealing system 1 communicates with the freight delivery vehicle management system 4, and obtains the freight delivery vehicle situation of each freight delivery vehicle from the freight delivery vehicle management system 4 by using the vehicle situation obtaining unit 10. Subsequently, the user vehicle dispatch dealing system 1 proceeds to step S20.

In step S20, the user vehicle dispatch dealing system 1 determines whether or not there are the freight delivery vehicles in a state where a first preset range defined based on the delivery route includes the riding point based on the freight delivery vehicle situation of each freight delivery vehicle obtained by the vehicle situation obtaining unit 10 by using the vehicle situation determination unit 11. When the vehicle situation determination unit determines that there are the freight delivery vehicles in a state where a first preset range defined based on the delivery route includes the riding point (step S20: YES), the user vehicle dispatch dealing system 1 proceeds to step S22. Meanwhile, when the vehicle situation determination unit does not determine that there are the freight delivery vehicles in a state where a first preset range defined based on the delivery route includes the riding point (step S20: NO), the user vehicle dispatch dealing system 1 proceeds to step S30.

In step S22, the user vehicle dispatch dealing system 1 determines whether or not there are the freight delivery vehicles as a dispatch vehicle candidates in a state where a second preset range defined based on the delivery route includes the destination point among the freight delivery vehicles in a state where a first preset range defined based on the delivery route includes the riding point based on the freight delivery vehicle situation of each freight delivery vehicle obtained by the vehicle situation obtaining unit 10 by using the vehicle situation determination unit 11. When the vehicle situation determination unit determines that there are the freight delivery vehicles (the freight delivery vehicles as the dispatch vehicle candidates) in a state where a second preset range defined based on the delivery route includes the destination point (step S22: YES), the user vehicle dispatch dealing system 1 proceeds to step S24. Meanwhile, when the vehicle situation determination unit does not determine that there are the freight delivery vehicles (the freight delivery vehicles as the dispatch vehicle candidates) in a state where a second preset range defined based on the delivery route includes the destination point (step S22: NO), the user vehicle dispatch dealing system 1 proceeds to step S30.

In step S24, the user vehicle dispatch dealing system 1 presents the option of whether or not to request the dispatch of the freight delivery vehicle as the dispatch vehicle candidate to the user by using the option presentation unit 12. Thereafter, the user vehicle dispatch dealing system 1 proceeds to step S26.

In step S26, the user vehicle dispatch dealing system 1 receives the option selected by the user from the user terminal 2 by presenting the option of whether or not to request the dispatch of the freight delivery vehicle as the dispatch vehicle candidate to the user by using the option presentation unit 12. The user vehicle dispatch dealing system 1 determines whether or not the option of dispatching the freight delivery vehicle as the dispatch vehicle candidate is selected by the user by using the option presentation unit 12. When the user vehicle dispatch dealing system determines that the option of dispatching the freight delivery vehicle as the dispatch vehicle candidate is selected by the user (step S26: YES), the user vehicle dispatch dealing system 1 proceeds to step S28. Meanwhile, when the user vehicle dispatch dealing system does not determine that the option of dispatching the freight delivery vehicle as the dispatch vehicle candidate is selected by the user (step S26: NO), the user vehicle dispatch dealing system 1 proceeds to step S30.

In step S28, the user vehicle dispatch dealing system 1 communicates with the freight delivery vehicle management system 4, and dispatches the freight delivery vehicle as the dispatch vehicle candidate by using the vehicle dispatch unit 13 in order to transport the passenger. Thereafter, the user vehicle dispatch dealing system 1 ends this process.

In step S30, the user vehicle dispatch dealing system 1 transmits a notification (a notification of vehicle dispatch unavailable) indicating that it is not able to dispatch the vehicle according to the received vehicle dispatch request in order to transport the passenger to the user terminal 2. Thereafter, the user vehicle dispatch dealing system 1 ends this process.

Even when the number of passenger transport vehicles (to be supplied) which are able to be dispatched is smaller than the number of vehicle dispatch requests (demanded) from the user, the user vehicle dispatch dealing system 1 can supplement the number of insufficient passenger transport vehicles with the number of freight delivery vehicles by performing the process of presenting the option of using the freight delivery vehicle. Accordingly, the user vehicle dispatch dealing system 1 can provide a vehicle dispatch service planned to optimize the overall traffic.

[Process of Presenting Option of Using User Freight Delivery Vehicle]

Figure 4:
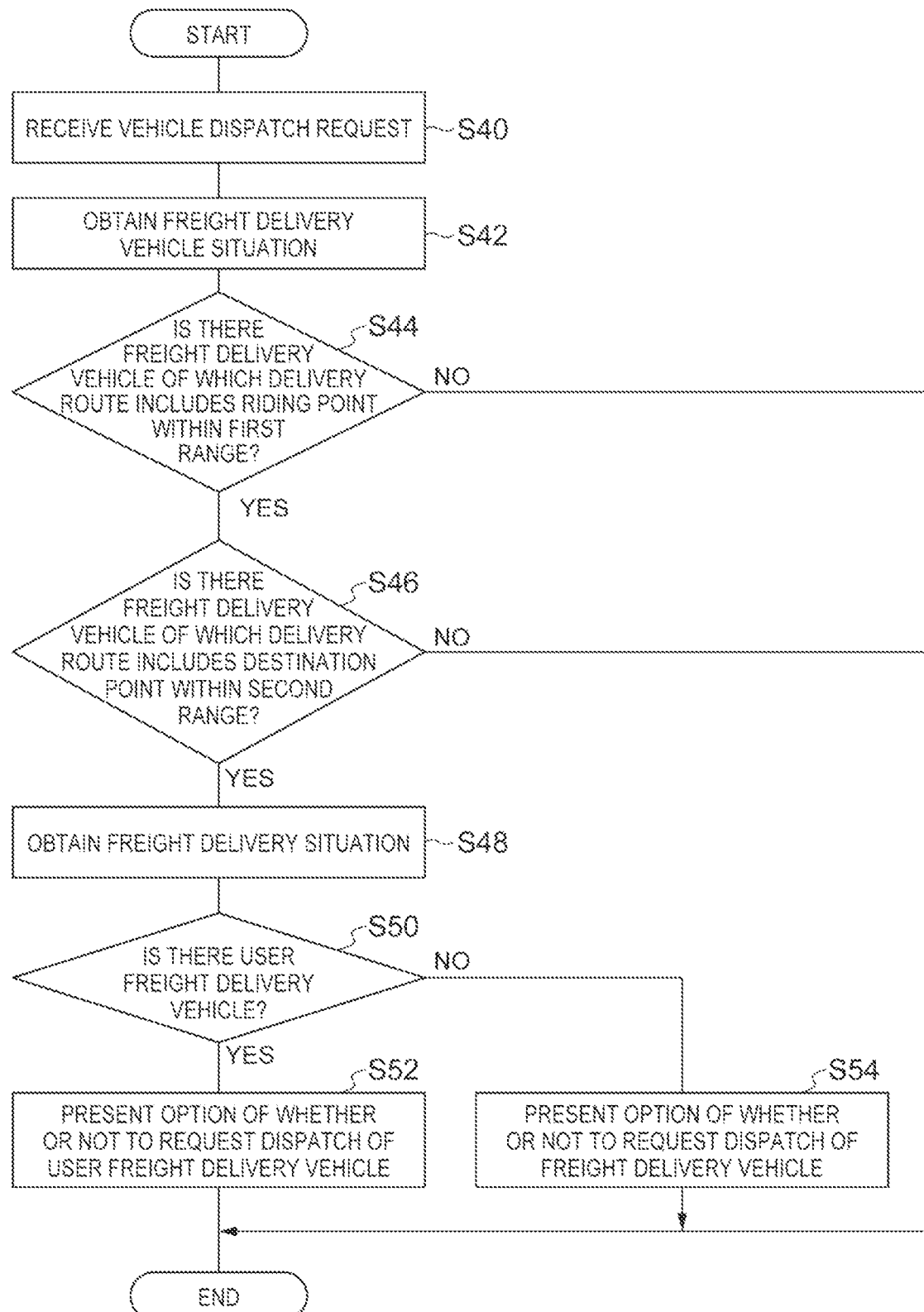
FIG. 4 is a flowchart showing a process of presenting an option of using a user freight delivery vehicle.

Next, a process of presenting an option of using the user freight delivery vehicle which is performed by the user vehicle dispatch dealing system 1 will be described. FIG. 4 is a flowchart showing the process of presenting the option of using the user freight delivery vehicle.

As shown in FIG. 4, the user vehicle dispatch dealing system 1 receives the vehicle dispatch request from the user from the user terminal 2 manipulated by the user in step S40. Thereafter, the user vehicle dispatch dealing system 1 proceeds to step S42.

In step S42, the user vehicle dispatch dealing system 1 communicates with the freight delivery vehicle management system 4, and obtains the freight delivery vehicle situation of each freight delivery vehicle from the freight delivery vehicle management system 4 by using the vehicle situation obtaining unit 10. Subsequently, the user vehicle dispatch dealing system 1 proceeds to step S44.

In step S44, the user vehicle dispatch dealing system 1 determines whether or not there are the freight delivery vehicles in a state where a first preset range defined based on the delivery route includes the riding point based on the freight delivery vehicle situation of each freight delivery vehicle obtained by the vehicle situation obtaining unit 10 by using the vehicle situation determination unit 11. When the vehicle situation determination unit determines that there are the freight delivery vehicles in a state where a first preset range defined based on the delivery route includes the riding point (step S44: YES), the user vehicle dispatch dealing system 1 proceeds to step S46. Meanwhile, when the vehicle situation determination unit does not determine that there are the freight delivery vehicles in a state where a first preset range defined based on the delivery route includes the riding point (step S44: NO), the user vehicle dispatch dealing system 1 does not present the option of whether or not to request the dispatch of the freight delivery vehicle or the user freight delivery vehicle, and ends this process.

In step S46, the user vehicle dispatch dealing system 1 determines whether or not there are the freight delivery vehicles as a dispatch vehicle candidates in a state where a second preset range defined based on the delivery route includes the destination point among the freight delivery vehicles in a state where the first range defined based on the delivery route includes the riding point based on the freight delivery vehicle situation of each freight delivery vehicle obtained by the vehicle situation obtaining unit 10 by using the vehicle situation determination unit 11. When the vehicle situation determination unit determines that there are the freight delivery vehicles (the freight delivery vehicles as the dispatch vehicle candidates) in a state where a second preset range defined based on the delivery route includes the destination point (step S46: YES), the user vehicle dispatch dealing system 1 proceeds to step S48. Meanwhile, when the vehicle situation determination unit does not determine that there are the freight delivery vehicles (the freight delivery vehicles as the dispatch vehicle candidates) in a state where a second preset range defined based on the delivery route includes the destination point (step S46: NO), the user vehicle dispatch dealing system 1 does not present the option of whether or not to request the dispatch of the freight delivery vehicle or the user freight delivery vehicle, and ends this process.

In step S48, the user vehicle dispatch dealing system 1 communicates with the freight delivery vehicle management system 4, and obtains the freight delivery situation using each freight delivery vehicle by using the user-addressed freight determination unit 14. Thereafter, the user vehicle dispatch dealing system 1 proceeds to step S50.

In step S50, the user vehicle dispatch dealing system 1 determines whether or not there is the user freight delivery vehicle which is the freight delivery vehicle that delivers the freight addressed to the user based on the obtained freight delivery situation by using the user-addressed freight determination unit 14. When the user-addressed freight determination unit determines that there is the user freight delivery vehicle (step S50: YES), the user vehicle dispatch dealing system 1 proceeds to step S52. Meanwhile, when the user-addressed freight determination unit does not determine that there is the user freight delivery vehicle (step S50: NO), the user vehicle dispatch dealing system 1 proceeds to step S54.

In step S52, the user vehicle dispatch dealing system 1 presents the option of whether or not to request the dispatch of the user freight delivery vehicle to the user by using the option presentation unit 12. Thereafter, the user vehicle dispatch dealing system 1 ends this process.

In step S54, the user vehicle dispatch dealing system 1 present the option of whether or not to request the dispatch of the freight delivery vehicle other than the user freight delivery vehicle among the freight delivery vehicles as the dispatch vehicle candidates to the user by using the option presentation unit 12. Thereafter, the user vehicle dispatch dealing system 1 ends this process.

When there is the user freight delivery vehicle, even if the passenger transport vehicle is able to be dispatched within a waiting time shorter than that of the user freight delivery vehicle, the user vehicle dispatch dealing system 1 can present the option of whether or not to request the dispatch of the user freight delivery vehicle by performing the process of presenting the option of using the user freight delivery vehicle.

When the user freight delivery vehicle is used as the vehicle for transporting the passenger, authentication for unlocking the user freight delivery vehicle may be performed by using identification (ID) for delivering the freight addressed to the user.

A manager of the passenger transport vehicle management system 3 may pay a manager of the freight delivery vehicle management system 4 depending on the number of times the user freight delivery vehicle is used as the vehicle for transporting passenger. In this case, the number of times the user freight delivery vehicle is used as the vehicle for transporting the passenger may be counted for every predetermined period of time (for example, monthly or annually).

[Process of Determining Whether or not User Freight Delivery Vehicle is Able to be Used]

Figure 5:
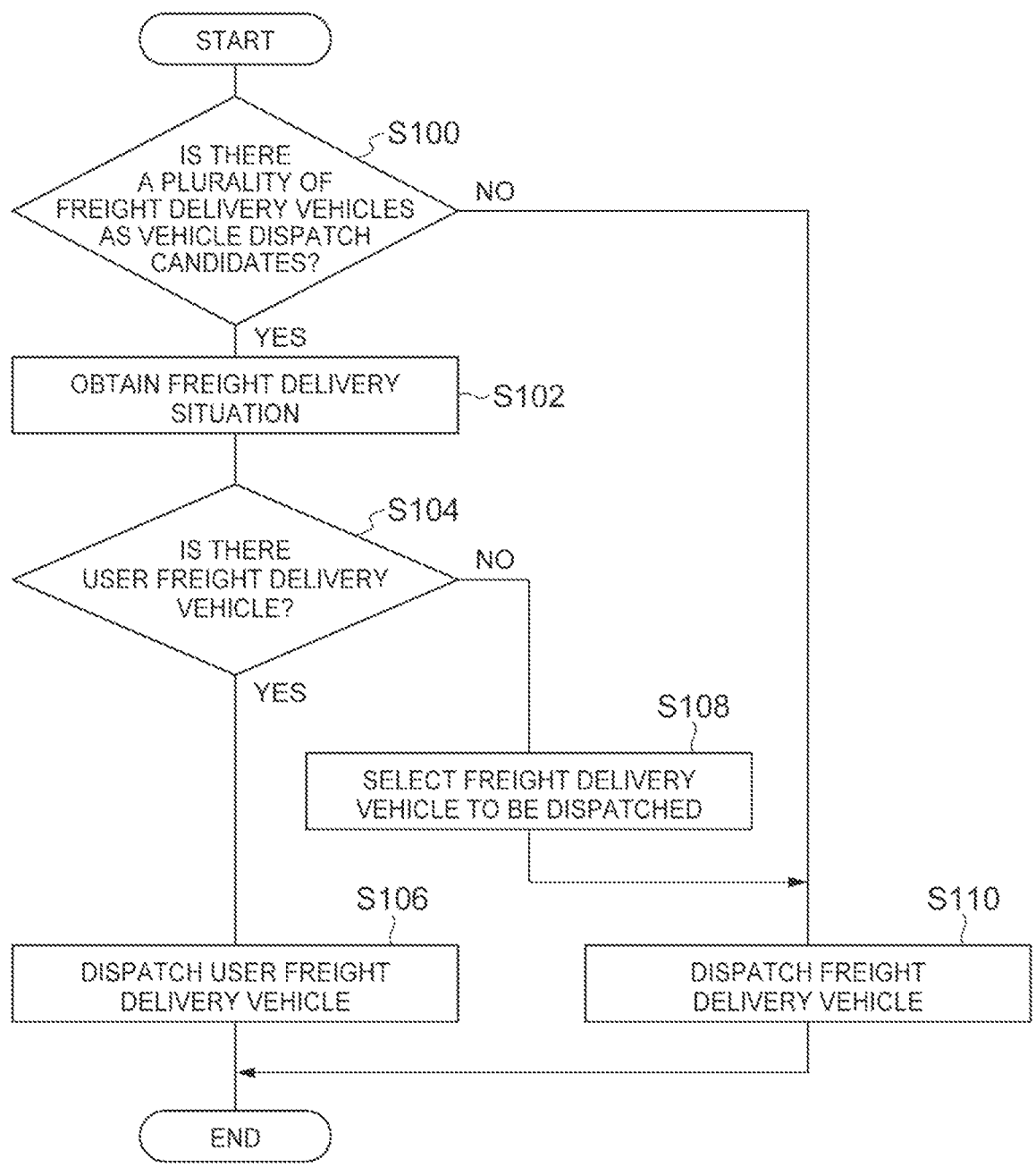
FIG. 5 is a flowchart showing a process of determining whether or not the user freight delivery vehicle is able to be used.

The user vehicle dispatch dealing system 1 may perform a process of determining whether or not the user freight delivery vehicle is able to be used to be described below. FIG. 5 is a flowchart showing the process of determining whether or not the user freight delivery vehicle is able to be used. The flowchart of FIG. 5 corresponds to step S28 in the flowchart of FIG. 3.

As shown in FIG. 5, the user vehicle dispatch dealing system 1 determines whether or not there are the freight delivery vehicles as the plurality of dispatch vehicle candidates by using the vehicle situation determination unit 11 in step S100. When the vehicle situation determination unit determines that there are the freight delivery vehicles as the plurality of dispatch vehicle candidates (step S100: YES), the user vehicle dispatch dealing system 1 proceeds to step S102. Meanwhile, when the vehicle situation determination unit does not determine that there are the freight delivery vehicles as the plurality of dispatch vehicle candidates (step S100: NO), the user vehicle dispatch dealing system 1 proceeds to step S110.

In step S102, the user vehicle dispatch dealing system 1 communicates with the freight delivery vehicle management system 4, and obtains the freight delivery situation using each freight delivery vehicle by using the user-addressed freight determination unit 14. Thereafter, the user vehicle dispatch dealing system 1 proceeds to step S104.

In step S104, the user vehicle dispatch dealing system 1 determines whether or not there is the user freight delivery vehicle which is the freight delivery vehicle that delivers the freight addressed to the user based on the obtained freight delivery situation by using the user-addressed freight determination unit 14. When the user-addressed freight determination unit determines that there is the user freight delivery vehicle (step S104: YES), the user vehicle dispatch dealing system 1 proceeds to step S106. Meanwhile, when the user-addressed freight determination unit does not determine that there is the user freight delivery vehicle (step S104: NO), the user vehicle dispatch dealing system 1 proceeds to step S108.

In step S106, the user vehicle dispatch dealing system 1 communicates with the freight delivery vehicle management system 4, and dispatches the user freight delivery vehicle by using the vehicle dispatch unit 13 in order to transport the user. Thereafter, the user vehicle dispatch dealing system 1 ends this process.

In step S108, the user vehicle dispatch dealing system 1 selects the freight delivery vehicle to be dispatched by the vehicle dispatch unit 13. The vehicle dispatch unit 13 selects the freight delivery vehicle to be dispatched among the freight delivery vehicles remaining after the user freight delivery vehicle is removed from the freight delivery vehicles as the plurality of dispatch vehicle candidates based on dispatch efficiency. For example, the vehicle dispatch unit 13 evaluates the dispatch efficiency based on a time required to dispatch the vehicle and transport the passenger, a location (a current position or a positional relationship with the user) of the freight delivery vehicle reliability of an autonomous driving system mounted on each freight delivery vehicle. Subsequently, the user vehicle dispatch dealing system 1 proceeds to step S110.

In step S110, the user vehicle dispatch dealing system 1 communicates with the freight delivery vehicle management system 4, and dispatches the freight delivery vehicle by using the vehicle dispatch unit 13 in order to transport the passenger. When the vehicle situation determination unit does not determine that there are the freight delivery vehicles as the plurality of dispatch vehicle candidates (that is, when the vehicle situation determination unit determines that there is only one freight delivery vehicle as the dispatch vehicle candidate) in step S100, the vehicle dispatch unit 13 dispatches the only one freight delivery vehicle as the dispatch vehicle candidate. Meanwhile, when the vehicle dispatch unit selects the freight delivery vehicle to be dispatched in step S108, the vehicle dispatch unit 13 dispatches the selected freight delivery vehicle. Thereafter, the user vehicle dispatch dealing system 1 ends this process.

The user vehicle dispatch dealing system 1 can positively associate the passenger transport vehicle management system 3 with the freight delivery vehicle management system 4 by performing the process of determining whether or not the user freight delivery vehicle is able to be used. Accordingly, the user vehicle dispatch dealing system 1 can improve the dispatch efficiency.

[Process of Delivering Freight Addressed to User During Passenger Transport]

Figure 6:
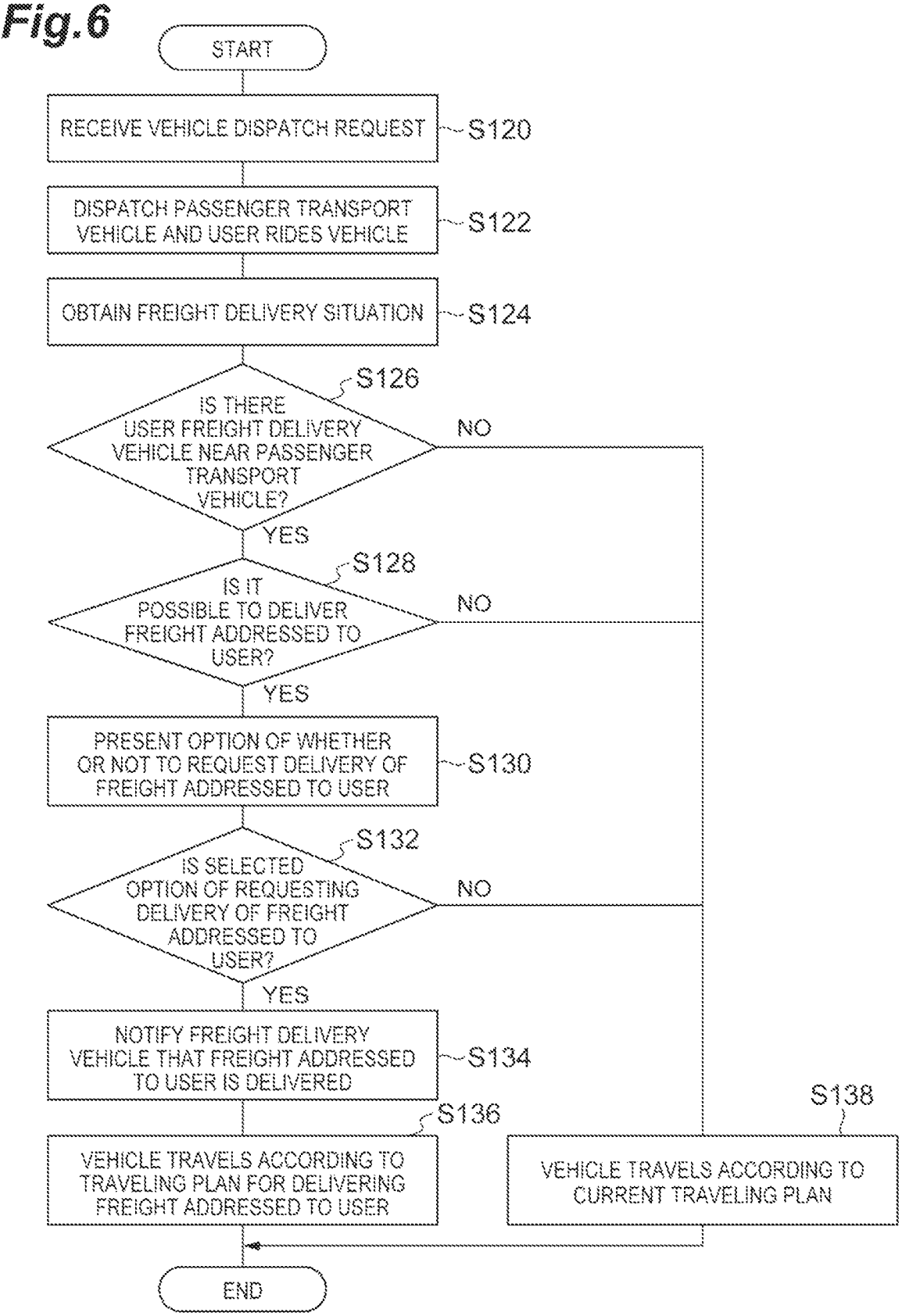
FIG. 6 is a flowchart showing a process of delivering the freight addressed to a user during passenger transport.

The user vehicle dispatch dealing system 1 may perform a process of delivering the freight addressed to the user during the passenger transport to be described below. When the user vehicle dispatch dealing system 1 may perform the process of delivering the freight addressed to the user during the passenger transport, each of the passenger transport vehicle and the freight delivery vehicle may automatically deliver the freight to each other. For example, each of the passenger transport vehicle and the freight delivery vehicle deliver the freight to each other by connecting a side part of the passenger transport vehicle with a side part of the freight delivery vehicle or connecting a front or rear part of the passenger transport vehicle with a front or rear part of the freight delivery vehicle. FIG. 6 is a flowchart showing the process of delivering the freight addressed to the user during the passenger transport.

As shown in FIG. 6, the user vehicle dispatch dealing system 1 receives the vehicle dispatch request from the user from the user terminal 2 manipulated by the user in step S120. Thereafter, the user vehicle dispatch dealing system 1 proceeds to step S122.

In step S122, the user vehicle dispatch dealing system 1 communicates with the passenger transport vehicle management system 3, and dispatches the passenger transport vehicle by using the vehicle dispatch unit 13 in order to transport the user. Subsequently, when the user rides the dispatched passenger transport vehicle, the user vehicle dispatch dealing system 1 proceeds to step S124.

In step S124, the user vehicle dispatch dealing system 1 communicates with the freight delivery vehicle management system 4, and obtains the freight delivery situation using each freight delivery vehicle by using the user-addressed freight determination unit 14. Subsequently, the user vehicle dispatch dealing system 1 proceeds to step S126.

In step S126, the user vehicle dispatch dealing system 1 determines whether or not there is the user freight delivery vehicle which is the freight delivery vehicle that delivers the freight addressed to the user based on the obtained freight delivery situation by using the user-addressed freight determination unit 14. The user vehicle dispatch dealing system 1 communicates with the passenger transport vehicle management system 3, and obtains the passenger transport vehicle situation of each passenger transport vehicle from the passenger transport vehicle management system 3 by using the vehicle situation obtaining unit 10. The user vehicle dispatch dealing system communicates with the freight delivery vehicle management system 4, and obtains the freight delivery vehicle situation of each freight delivery vehicle from the freight delivery vehicle management system 4. The user vehicle dispatch dealing system 1 determines whether or not there is the user freight delivery vehicle near the passenger transport vehicle in which the user is riding based on the passenger transport vehicle situation and the freight delivery vehicle situation by using the vehicle situation determination unit 11.

The "there is the user freight delivery vehicle near the passenger transport vehicle" may mean that a direct distance between the current position of the user freight delivery vehicle and the current position of the passenger transport vehicle falls in a range of a preset distance, may mean that a distance along a road between the current position of the user freight delivery vehicle and the current position of the passenger transport vehicle falls within a range of a preset distance, or may mean that a time required to travel between the current position of the user freight delivery vehicle and the current position of the passenger transport vehicle falls within a range of a preset time.

When the user-addressed freight determination unit determines that there is the user freight delivery vehicle near the passenger transport vehicle in which the user is riding (step S126: YES), the user vehicle dispatch dealing system 1 proceeds to step S128. Meanwhile, when the user-addressed freight determination unit does not determine that there is the user freight delivery vehicle near the passenger transport vehicle in which the user is riding (step S126: NO), the user vehicle dispatch dealing system 1 proceeds to step S138.

In step S128, the user vehicle dispatch dealing system 1 determines whether or not the freight addressed to the user is able to be delivered to the passenger transport vehicle in which the user is riding from the user freight delivery vehicle by using the vehicle situation obtaining unit 10. For example, the vehicle situation obtaining unit 10 determines whether or not the freight addressed to the user is able to be delivered to the passenger transport vehicle from the user freight delivery vehicle based on standards of the passenger transport vehicle and the user freight delivery vehicle, a surrounding environment, and a current traveling plan of the passenger transport vehicle and the delivery route of the user freight delivery vehicle. When the user vehicle dispatch dealing system determines that the freight addressed to the user is able to be delivered to the passenger transport vehicle from the user freight delivery vehicle (step S128: YES), the user vehicle dispatch dealing system 1 proceeds to step S130. Meanwhile, when the user vehicle dispatch dealing system does not determine that the freight addressed to the user is able to be delivered to the passenger transport vehicle from the user freight delivery vehicle (step S128: NO), the user vehicle dispatch dealing system 1 proceeds to step S138.

In step S130, the user vehicle dispatch dealing system 1 presents an option of whether or not to request the delivery of the freight addressed to the user to the passenger transport vehicle from the user freight delivery vehicle to the user by using the option presentation unit 12. Subsequently, the user vehicle dispatch dealing system 1 proceeds to step S132.

In step S132, the user vehicle dispatch dealing system 1 receives the option selected by the user from the user terminal 2 by using the option presentation unit 12 by presenting the option of whether or not to request the delivery of the freight addressed to the user to the passenger transport vehicle from the user freight delivery vehicle to the user. The user vehicle dispatch dealing system 1 determines whether or not the option of requesting the delivery of the freight addressed to the user to the passenger transport vehicle from the user freight delivery vehicle is selected by the user by using the option presentation unit 12. When the user vehicle dispatch dealing system determines that the option of requesting the delivery of the freight addressed to the user to the passenger transport vehicle from the user freight delivery vehicle is selected by the user (step S132: YES), the user vehicle dispatch dealing system 1 proceeds to step S134. Meanwhile, when the user vehicle dispatch dealing system does not determine that the option of requesting the delivery of the freight addressed to the user to the passenger transport vehicle from the user freight delivery vehicle is selected by the user (step S132: NO), the user vehicle dispatch dealing system 1 proceeds to step S138.

In step S134, the user vehicle dispatch dealing system 1 communicates with the freight delivery vehicle management system 4, and notifies the user freight delivery vehicle that the freight addressed to the user is delivered to the passenger transport vehicle from the user freight delivery vehicle by using the vehicle dispatch unit 13. Subsequently, the user vehicle dispatch dealing system 1 proceeds to step S136.

In step S136, the user vehicle dispatch dealing system 1 communicates with the freight delivery vehicle management system 4, changes the traveling plan of the user freight delivery vehicle to a new traveling plan for delivering the freight addressed to the user by using the vehicle dispatch unit 13, and causes the user freight delivery vehicle to travel according to the new traveling plan. Thereafter, the user vehicle dispatch dealing system 1 ends this process.

In step S138, the user vehicle dispatch dealing system 1 does not change the traveling plan of the user freight delivery vehicle. That is, the user freight delivery vehicle travels according to the current traveling plan. Thereafter, the user vehicle dispatch dealing system 1 ends this process.

The user vehicle dispatch dealing system 1 can positively associate the passenger transport vehicle management system 3 with the freight delivery vehicle management system 4 by performing the process of delivering the freight addressed to the user during the passenger transport. Accordingly, the user vehicle dispatch dealing system 1 can improve efficiency in the transport of the passenger and the delivery of the freight.

The process of delivering the freight addressed to the user during the passenger transport is not limited to a situation in which the freight addressed to the user is stored in the freight delivery vehicle, and may be performed in a situation in which the freight addressed to the user is stored in a delivery center of the freight delivery vehicle management system 4. In this case, each of the passenger transport vehicle and the delivery center may automatically deliver the freight to each other. When the delivery center is positioned near the passenger transport vehicle in which the user is riding and the freight addressed to the user is able to be delivered to the passenger transport vehicle from the delivery center, the option of whether or not to request the delivery of the freight addressed to the user to the passenger transport vehicle from the delivery center is presented to the user.

[Process of Notifying of Whether or not Freight Addressed to User Before Vehicle Dispatch is Able to be Delivered]

Figure 7:
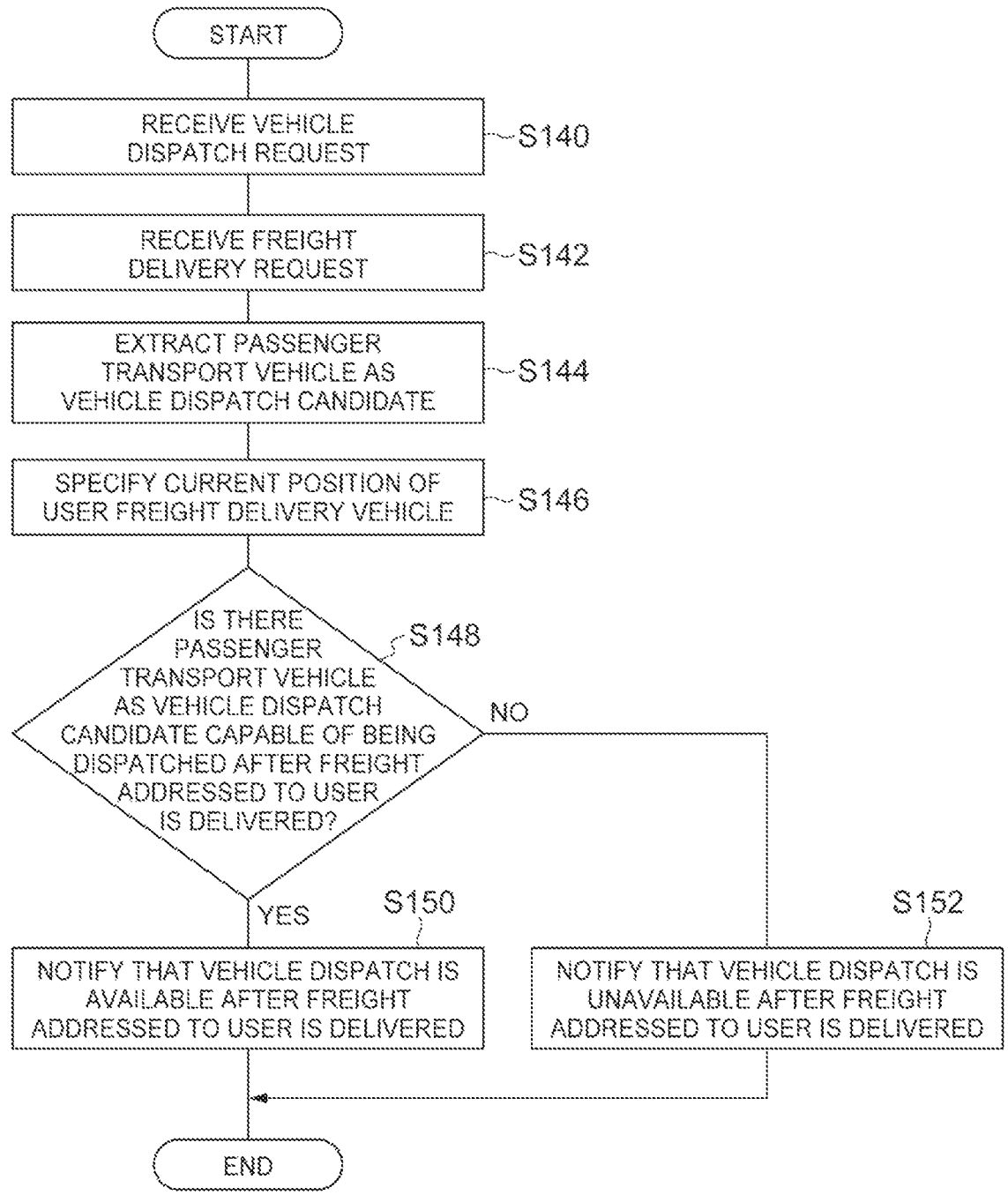
FIG. 7 is a flowchart showing a process of notifying of whether or not the freight addressed to the user is able to be delivered before vehicle dispatch.

The user vehicle dispatch dealing system 1 may perform a process of notifying of whether or not the freight addressed to the user is able to be delivered before the vehicle dispatch to be described below. When the user vehicle dispatch dealing system 1 may perform the process of notifying of whether or not the freight addressed to the user is able to be delivered before the vehicle dispatch, each of the passenger transport vehicle and the freight delivery vehicle may automatically deliver the freight to each other. For example, each of the passenger transport vehicle and the freight delivery vehicle deliver the freight to each other by connecting a side part of the passenger transport vehicle with a side part of the freight delivery vehicle or connecting a front or rear part of the passenger transport vehicle with a front or rear part of the freight delivery vehicle. FIG. 7 is a flowchart showing a process of delivering the freight addressed to the user before the vehicle dispatch.

As shown in FIG. 7, the user vehicle dispatch dealing system 1 receives the vehicle dispatch request from the user from the user terminal 2 manipulated by the user in step S140. Thereafter, the user vehicle dispatch dealing system 1 proceeds to step S142.

In step S142, the user vehicle dispatch dealing system 1 receives a delivery freight request addressed to the user who transmits the vehicle dispatch request from the user terminal 2 manipulated by the user who transmits a vehicle dispatch request or another user terminal 2 manipulated by another user. The "freight request" is a delivery request for the freight addressed to the user. Thereafter, the user vehicle dispatch dealing system 1 proceeds to step S144.

In step S144, the user vehicle dispatch dealing system 1 communicates with the passenger transport vehicle management system 3, and obtains the passenger transport vehicle situation of each passenger transport vehicle from the passenger transport vehicle management system 3 by using the vehicle situation obtaining unit 10. The user vehicle dispatch dealing system 1 extracts the passenger transport vehicles as the dispatch vehicle candidates by using the vehicle situation determination unit 11. Thereafter, the user vehicle dispatch dealing system 1 proceeds to step S146.

In step S146, the user vehicle dispatch dealing system 1 communicates with the freight delivery vehicle management system 4, obtains the freight delivery situation using each freight delivery vehicle, and extracts the user freight delivery vehicle which is the freight delivery vehicle that delivers the freight addressed to the user based on the obtained freight delivery situation by using the user-addressed freight determination unit 14. The user vehicle dispatch dealing system 1 communicates with the freight delivery vehicle management system 4, obtains the freight delivery vehicle situation of the user freight delivery vehicle from the freight delivery vehicle management system 4, and specifies the current position of the user freight delivery vehicle by using the vehicle situation obtaining unit 10. Thereafter, the user vehicle dispatch dealing system 1 proceeds to step S148.

In step S148, the user vehicle dispatch dealing system 1 can deliver the freight addressed to the user from the user freight delivery vehicle among the extracted passenger transport vehicles as the dispatch vehicle candidates and determines whether or not there are the passenger transport vehicles capable of being dispatched after the freight addressed to the user is delivered by using the vehicle situation determination unit 11.

The "passenger transport vehicles capable of being dispatched after the freight addressed to the user is delivered" may mean that a time obtained by subtracting a second shortest waiting time from a first shortest waiting time to be described below is equal to or smaller than a preset time (threshold). That is, the "first shortest waiting time" is a shortest waiting time when a waiting time until the vehicle is dispatched after the freight addressed to the user is delivered from the user freight delivery vehicle is calculated for each passenger transport vehicle as the dispatch vehicle candidate based on the current position of each passenger transport vehicle as the dispatch vehicle candidate, the current position of the user freight delivery vehicle, and the riding point of the user. The "second shortest waiting time" is a shortest waiting time when a waiting time until the vehicle is dispatched without delivering the freight addressed to the user from the user freight delivery vehicle is calculated for each passenger transport vehicle as the dispatch vehicle candidate based on the current position of each passenger transport vehicle as the dispatch vehicle candidate and the riding point of the user.

The user vehicle dispatch dealing system 1 can deliver the freight addressed to the user from the user freight delivery vehicle, and proceeds to step S150 when the user vehicle dispatch dealing system determines that there is the passenger transport vehicle capable of being dispatched after the freight addressed to the user is delivered (step S148: YES). Meanwhile, the user vehicle dispatch dealing system 1 can deliver the freight addressed to the user from the user freight delivery vehicle, and proceeds to step S152 when the user vehicle dispatch dealing system does not determine that there is the passenger transport vehicle capable of being dispatched after the freight addressed to the user is delivered (step S148: NO).

In step S150, the user vehicle dispatch dealing system 1 transmits a notification indicating that the passenger transport vehicle is able to be dispatched after the freight addressed to the user is delivered from the user freight delivery vehicle to the passenger transport vehicle to the user terminal 2. Thereafter, the user vehicle dispatch dealing system 1 ends this process.

In step S152, the user vehicle dispatch dealing system 1 transmits a notification indicating that the passenger transport vehicle is not able to be dispatched after the freight addressed to the user is delivered from the user freight delivery vehicle to the passenger transport vehicle to the user terminal 2. Thereafter, the user vehicle dispatch dealing system 1 ends this process.

The user vehicle dispatch dealing system 1 can positively associate the passenger transport vehicle management system 3 with the freight delivery vehicle management system 4 by performing the process of notifying of whether or not the freight addressed to the user is able to be delivered before the vehicle dispatch. Accordingly, the user vehicle dispatch dealing system 1 can improve efficiency in the transport of the passenger and the delivery of the freight.

[Actions and Effects]

As described above, according to the user vehicle dispatch dealing system 1, the passenger transport vehicle is normally used to transport the passenger. Meanwhile, when there is the freight delivery vehicle as a dispatch vehicle candidate in a state where a first preset range defined based on the delivery route includes the riding point, the option of whether or not to request the dispatch of the freight delivery vehicle as the dispatch vehicle candidate is presented to the user. Thus, the user vehicle dispatch dealing system 1 can allow the user to select whether or not to use the freight delivery vehicle capable of being dispatched in the passenger transport instead of the passenger transport vehicle. Accordingly, the user vehicle dispatch dealing system 1 can increase the number of options for selecting the vehicles capable of being used by the user in order to transport the passenger.

In the user vehicle dispatch dealing system 1, the vehicle situation determination unit 11 determines that there is the freight delivery vehicle as the dispatch vehicle candidate when there is the freight delivery vehicle in a state where the first range defined based on the delivery route includes the riding point and in a state where a second preset range defined based on the delivery route includes the destination point. Accordingly, the user vehicle dispatch dealing system 1 can allow the user to select whether or not to use the freight delivery vehicle capable of being dispatched and transporting the user to the destination point in the passenger transport instead of the passenger transport vehicle. Therefore, in the user vehicle dispatch dealing system 1, the user can select the vehicle to be dispatched depending on the distance between the point at which the user leaves the vehicle and the destination point.

The user vehicle dispatch dealing system 1 includes the user-addressed freight determination unit 14 that obtains the freight delivery situation using the freight delivery vehicle and determines whether or not there is the user freight delivery vehicle which is the freight delivery vehicle that delivers the freight addressed to the user based on the freight delivery situation when the vehicle dispatch request is received. The option presentation unit 12 presents the option of whether or not to request the dispatch of the user freight delivery vehicle to the user when the user-addressed freight determination unit 14 determines that there is the user freight delivery vehicle. Accordingly, the user vehicle dispatch dealing system 1 can allow the user to select whether or not to use the user freight delivery vehicle that delivers the freight addressed to the user in the passenger transport instead of the passenger transport vehicle. When the user freight delivery vehicle is used to transport the passenger instead of the passenger transport vehicle, since the user can move by using the dispatched user freight delivery vehicle and receives their freight from the user freight delivery vehicle, the efficiency in the transport of the passenger and the delivery of the freight is improved. Thus, in the user vehicle dispatch dealing system 1, the user can select the vehicle to be dispatched depending on the efficiency in the transport of the passenger and the delivery of the freight.

In the user vehicle dispatch dealing system 1, the vehicle situation obtaining unit 10 obtains the passenger transport vehicle situation including the current position of the passenger transport vehicle when the vehicle dispatch request is received, the vehicle situation determination unit 11 determines whether or not there is the passenger transport vehicle as the dispatch vehicle candidate in a state where a third preset range defined based on the current position of the passenger transport vehicle includes the riding point based on the passenger transport vehicle situation obtained by the vehicle situation obtaining unit 10, and the option presentation unit 12 does not present the option of whether or not to request the dispatch of the freight delivery vehicle as the dispatch vehicle candidate to the user when the vehicle situation determination unit 11 determines that there is the passenger transport vehicle as the dispatch vehicle candidate, and presents the option of whether or not to request the dispatch of the freight delivery vehicle as the dispatch vehicle candidate to the user when the vehicle situation determination unit 11 does not determine that there is the passenger transport vehicle as the dispatch vehicle candidate and determines that there is the freight delivery vehicle as the dispatch vehicle candidate. The user vehicle dispatch dealing system includes the vehicle dispatch unit 13 that dispatches the freight delivery vehicle as the dispatch vehicle candidate in order to transport the user when the option of requesting the dispatch of the freight delivery vehicle as the dispatch vehicle candidate is selected by the user. Accordingly, the user vehicle dispatch dealing system 1 uses the passenger transport vehicle in the passenger transport when there is the passenger transport vehicle capable of being promptly dispatched. Meanwhile, the user vehicle dispatch dealing system 1 can allow the user to select whether or not to use the freight delivery vehicle capable of being dispatched in the passenger transport instead of the passenger transport vehicle when there is no passenger transport vehicle capable of being promptly dispatched. The user vehicle dispatch dealing system 1 can dispatch the freight delivery vehicle when the option of using the freight delivery vehicle in the passenger transport is selected by the user. Therefore, in the user vehicle dispatch dealing system 1, there is a high possibility that the vehicle for transporting the passenger will be able to be promptly dispatched.

A user vehicle dispatch dealing program includes a main module, an input module, and an arithmetic processing module. The main module is a module that generally controls an operation of the server. The input module operates the server so as to accept an input from the user from the user terminal 2. The arithmetic processing module is a module that performs the arithmetic processing. Functions realized by executing the main module, the input module, and the arithmetic processing module are the same as the functions of the user vehicle dispatch dealing system 1. For example, the user vehicle dispatch dealing program is provided by a non-transitory computer-readable storage medium such as a ROM or a semiconductor memory. The user vehicle dispatch dealing program may be provided via a network.

Modification Example

The above-described embodiment can be performed in various aspects obtained by performing various changes and modifications based on the knowledge of those skilled in the art.

For example, the freight delivery vehicle as the dispatch vehicle candidate may be the freight delivery vehicle in a state where the first range defined based on the delivery route includes the riding point irrespective of whether or not in a state where a second preset range defined based on the delivery route includes the destination point. That is, the vehicle situation determination unit 11 may determine whether or not there is the freight delivery vehicle as the dispatch vehicle candidate in a state where the first range defined based on the delivery route includes the riding point based on the freight delivery vehicle situation of each freight delivery vehicle obtained by the vehicle situation obtaining unit 10. In other words, the vehicle situation determination unit 11 may determine that there is the freight delivery vehicle as the dispatch vehicle candidate when there is the freight delivery vehicle of which the delivery point includes the riding point within the first range.

The user vehicle dispatch dealing system 1 may not include the vehicle dispatch unit 13 or may not include the user-addressed freight determination unit 14. In this case, the user vehicle dispatch dealing system 1 can increase the number of options of the vehicles capable of being used by the user in order to transport the passenger by presenting the option of whether or not to request the dispatch of the freight delivery vehicle as the dispatch vehicle candidate to the user by using the option presentation unit 12 when the vehicle situation determination unit 11 determines that there is the freight delivery vehicle as the dispatch vehicle candidate.

In the user vehicle dispatch dealing system 1, the vehicle situation obtaining unit 10 may not obtain the passenger transport vehicle situation when the vehicle dispatch request is received, and the vehicle situation determination unit 11 may not determine whether or not there is the passenger transport vehicle as the dispatch vehicle candidate in a state where a third preset range defined based on the current position of the passenger transport vehicle includes the riding point based on the passenger transport vehicle situation. In this case, the user vehicle dispatch dealing system 1 may proceed to step S18 after step S10 is performed or may end the process when step S24 is performed in the process of presenting the option of using the freight delivery vehicle shown in the flowchart of FIG. 3.

In the process of presenting the option of using the freight delivery vehicle shown in the flowchart of FIG. 3, the user vehicle dispatch dealing system 1 may proceed to step S16 when the vehicle situation determination unit does not determine that there is the freight delivery vehicle in a state where the first range defined based on the delivery route includes the riding point in step S20 (step S20: NO). The user vehicle dispatch dealing system 1 may proceed to step S16 when the vehicle situation determination unit does not determine that there is the freight delivery vehicle (the freight delivery vehicle as the dispatch vehicle candidate) in a state where a second preset range defined based on the delivery route includes the destination point in step S22 (step S22: NO). The user vehicle dispatch dealing system 1 may proceed to step S16 when the user vehicle dispatch dealing system does not determine that the option of requesting the dispatch of the freight delivery vehicle as the dispatch vehicle candidate is selected by the user in step S26 (step S26: NO). In these cases, for example, a waiting time to dispatch the vehicle becomes long, but the passenger transport vehicle is dispatched. Thus, it is possible to prevent the vehicle for transporting the passenger from not being dispatched.

The user vehicle dispatch dealing system 1 may not perform at least one process among the process of presenting the option of using the user freight delivery vehicle shown in the flowchart of FIG. 4, the process of determining whether or not the user freight delivery vehicle is able to be used as shown in the flowchart of FIG. 5, the process of delivering the freight addressed to the user during the passenger transport shown in the flowchart of FIG. 6, and the process of delivering the freight addressed to the user before the vehicle dispatch shown in the flowchart of FIG. 7.

The vehicle situation determination unit 11 may determine whether or not there is the freight delivery vehicle as the dispatch vehicle candidate with consideration for the current position of the freight delivery vehicle. That is, the vehicle situation determination unit 11 may determine whether or not there is the freight delivery vehicle as the dispatch vehicle candidate of which the current position satisfies the predetermined condition among the freight delivery vehicle in a state where the first range defined based on the delivery route includes the riding point and in a state where a second preset range defined based on the delivery route includes the destination point. The predetermined condition may be a condition in which the freight delivery vehicle is able to be promptly dispatched from the current position to the riding point of the user. More specifically, the predetermined condition may be a condition in which the distance (the direct distance or the distance along the road) between the current position and the riding point is equal to or smaller than a predetermined distance or may be a condition in which a time required to travel between the current position and the riding point is equal to or smaller than a predetermined time.

What is claimed is:

1. A user vehicle dispatch dealing system comprising:
a processor configured to:
obtain a current position of a passenger transport vehicle when a vehicle dispatch request is received;
determine the passenger transport vehicle is a passenger transport vehicle candidate when the obtained current position of the passenger transport vehicle is within a first preset range defined based on a riding point related to the vehicle dispatch request; and
based on no passenger transport vehicles being determined to be a passenger transport vehicle candidate for the vehicle dispatch request:
obtain a situation of a freight delivery vehicle, the situation of the freight delivery vehicle including a delivery route and a current position of the freight delivery vehicle, wherein the freight delivery vehicle is an autonomous driving vehicle that primarily delivers freight;
determine the freight delivery vehicle is a passenger transport dispatch vehicle candidate based on the riding point being included within a second preset range defined based on the delivery route, wherein the passenger transport dispatch vehicle candidate transports a passenger from the riding point; and
based on determining that the freight delivery vehicle is a passenger transport dispatch vehicle candidate, present an option to request the dispatch of the freight delivery vehicle to perform a function as the passenger transport dispatch vehicle candidate by transporting a user from the riding point.

2. The user vehicle dispatch dealing system according to claim 1, wherein the processor is further configured to: determine that the freight delivery vehicle is a passenger transport dispatch vehicle candidate when the freight delivery vehicle is in a state where the second range defined based on the delivery route includes the riding point and in a state where the second preset range defined based on the delivery route includes a destination point.

3. The user vehicle dispatch dealing system according to claim 1, wherein the first preset predefined range is different from the second preset range.

4. A non-transitory computer-readable storage medium configured to store a user vehicle dispatch dealing program including instructions that, when executed by a processor, cause the processor to:
obtain a current position of a passenger transport vehicle when a vehicle dispatch request is received;
determine the passenger transport vehicle is a passenger transport vehicle candidate when the obtained current position of the passenger transport vehicle is within a first preset range defined based on a riding point related to the vehicle dispatch request; and
based on no passenger transport vehicles being determined to be a passenger transport vehicle candidate for the vehicle dispatch request:
obtain a situation of a freight delivery vehicle, the situation of the freight delivery vehicle including a delivery route and a current position of the freight delivery vehicle, wherein the freight delivery vehicle is an autonomous driving vehicle that primarily delivers freight;
determine the freight delivery vehicle is a passenger transport dispatch vehicle candidate based on the riding point being included within a second preset range defined based on the delivery route, wherein the passenger transport dispatch vehicle candidate transports a passenger from the riding point; and
based on determining that the freight delivery vehicle is a passenger transport dispatch vehicle candidate, present an option to request the dispatch of the freight delivery vehicle to perform a function as the passenger transport dispatch vehicle candidate by transporting a user from the riding point.

5. A method comprising:
obtaining a current position of a passenger transport vehicle when a vehicle dispatch request is received;

determining the passenger transport vehicle is a passenger transport vehicle candidate when the obtained current position of the passenger transport vehicle is within a first preset range defined based on a riding point related to the vehicle dispatch request; and based on no passenger transport vehicles being determined to be a passenger transport vehicle candidate for the vehicle dispatch request:
- obtaining a situation of a freight delivery vehicle, the situation of the freight delivery vehicle including a delivery route and a current position of the freight delivery vehicle, wherein the freight delivery vehicle is an autonomous driving vehicle that primarily delivers freight;
- determining the freight delivery vehicle is a passenger transport dispatch vehicle candidate based on the riding point being included within a second preset range defined based on the delivery route, wherein the passenger transport dispatch vehicle candidate transports a passenger from the riding point; and
- based on determining that the freight delivery vehicle is a passenger transport dispatch vehicle candidate, presenting an option to request the dispatch of the freight delivery vehicle to perform a function as the passenger transport dispatch vehicle candidate by transporting a user from the riding point.

* * * * *